United States Patent [19]
Kometani et al.

[11] Patent Number: 6,166,471
[45] Date of Patent: Dec. 26, 2000

[54] DYNAMO-ELECTRIC MACHINE

[75] Inventors: Haruyuki Kometani; Yoshihito Asao; Katsumi Adachi, all of Tokyo, Japan

[73] Assignee: Mitsubishi Denki Kabushiki Kaisha, Tokyo, Japan

[21] Appl. No.: 09/394,506

[22] Filed: Sep. 13, 1999

[30] Foreign Application Priority Data

Feb. 15, 1999 [JP] Japan ................................. 11-036064

[51] Int. Cl.⁷ .............................. H02K 1/17; H02K 3/00; H02K 3/28; H02K 19/34
[52] U.S. Cl. ........................................... 310/198; 179/193
[58] Field of Search ................................... 310/179, 195, 310/193, 198, 206, 207, 263

[56] References Cited

U.S. PATENT DOCUMENTS

| | | | |
|---|---|---|---|
| 4,263,526 | 4/1981 | Taguchi et al. | 310/263 |
| 5,006,745 | 4/1991 | Nishio et al. | 310/177 |
| 5,122,705 | 6/1992 | Kusase et al. | 310/68 D |

FOREIGN PATENT DOCUMENTS 09172762  6/1997  Japan.

*Primary Examiner*—Clayton LaBalle
*Attorney, Agent, or Firm*—Sughrue, Mion, Zinn, Macpeak & Seas, PLLC

[57] ABSTRACT

A dynamo-electric machine comprises a stator having a stator core formed with 9 slots and a first 3-phase stator coil and a second 3-phase stator coil inserted into the slots, and a rotor disposed inside the stator for forming 8 magnetic poles, the first 3-phase stator coil and the second 3-phase stator coil each comprising a U-phase coil portion, a V-phase coil portion, and a W-phase coil portion, each formed by winding wire onto teeth, wherein each of the phase coil portions of the first 3-phase stator coil and the phase coil portions of the second 3-phase stator coil corresponding to the phase coil portions are positioned so as to be offset from one another by a distance of one tooth in the circumferential direction.

6 Claims, 5 Drawing Sheets a : b = 5 : 6

DYNAMO-ELECTRIC MACHINE

BACKGROUND OF THE INVENTION

1. Field of the Invention

The present invention relates to a dynamo-electric machine for generating an alternating voltage in a stator by rotating a rotor, for example.

2. Description of the Related Art

FIG. 5 is a cross-section of an automotive alternator (hereinafter simply "alternator") being a conventional dynamo-electric machine.

The alternator comprises: a case having an aluminum front bracket 1 and an aluminum rear bracket 2; a shaft 5 disposed in the case so as to rotate freely having a pulley 4 secured to one end thereof; a Lundell-type rotor 6 secured to the shaft 5; fans 7 secured to both ends of the rotor 6; a stator 8 secured to the inner wall of the case 3; slip rings 9 secured to the other end of the shaft 5 for supplying electric current to the rotor 6; brushes 10 sliding in contact with the slip rings 9; brush holders 11 accommodating the brushes 10; a rectifier 12 in electrical contact with the stator 8 for converting the alternating current generated in the stator 8 to a direct current; a heat sink 13 fitted over the brush holders 11; and a regulator 14 fastened to the heat sink 13 by adhesive for adjusting the magnitude of the alternating current generated in the stator 8.

The rotor 6 comprises a rotor coil 15 for passing an electric current through and generating a magnetic flux, and a pole core 16 covering the rotor coil 15 in which magnetic poles are produced by means of the magnetic flux. The pole core 16 comprises a first pole core assembly 17 and a second pole core assembly 18 which are mutually interlocked. The first pole core assembly 17 and the second pole core assembly 18 are made of iron and have a total of eight claw-shaped magnetic poles 19, 20 at their ends. Spaces (not shown) are formed between adjacent claw-shaped magnetic poles 19, 20 in order to prevent magnetic flux from leaking from between the claw-shaped magnetic poles 19, 20, and also to function as cooling passages for cooling the rotor coil 15.

The stator 8 comprises a stator core 22, and a 3-phase stator coil 23 composed of wire wound onto the stator core. The stator core 22 is constructed by punching thin sheets of steel plate into evenly-spaced comb shapes and winding or laminating the comb-shaped plates into an annular shape. FIG. 6 is a diagram showing a stator 8 formed with teeth 26 and slots 27 in nine places opened out flat, but the slots 27 and teeth 26 extending in the radial direction are actually formed on the inner circumference of the stator core 22. In the annular shape, the teeth 26 are formed with an even pitch of 40 mechanical degrees being 360 degrees/9. In this example, because the slots 27 correspond evenly to the eight poles, the electrical angle between the center lines A of the openings 29 of the slots 27 extending in the radial direction is 160 degrees.

The three-phase stator coil 23 is inserted into the slots 27. The three-phase stator coil 23 comprises a U-phase coil portion 31, a V-phase coil portion 32, and a W-phase coil portion 33 each composed of wire wound onto the teeth 26.

The three-phase stator coil 23 is formed by a method called "concentrated winding", the procedure for which will be explained below. First, wire is wound clockwise onto tooth 26 No. 1, and then the wire is wound counterclockwise onto tooth 26 No. 2. The wire is then wound clockwise onto tooth 26 No. 3 to form the U-phase coil portion 31.

Similarly, wire is wound clockwise onto tooth 26 No. 4, then the wire is wound counterclockwise onto tooth 26 No. 5, and the wire is then wound clockwise onto tooth 26 No. 6 to form the V-phase coil portion 32.

Similarly, wire is wound clockwise onto tooth 26 No. 7, then the wire is wound counterclockwise onto tooth 26 No. 8, and the wire is then wound clockwise onto tooth 26 No. 9 to form the W-phase coil portion 33.

Then, one end of each of the U-phase coil portion 31, the V-phase coil portion 32, and the W-phase coil portion 33 is connected to an output terminal, and the other end of each is electrically connected to a neutral point.

In a vehicle alternator of the above construction, a current is supplied by a battery (not shown) through the brushes 10 and slip rings 9 to the rotor coil 15, generating a magnetic flux, whereby the claw-shaped magnetic poles 19 of the first pole core assembly 17 are polarized with north-seeking (N) poles and the claw-shaped magnetic poles 20 of the second pole core assembly 18 are polarized with south-seeking (S) poles.

At the same time, the pulley 4 is rotated by the engine, and the rotor 6 rotates together with the shaft 5. Consequently, a rotating magnetic field is imparted to the stator coil 23 and electromotive force is generated. This alternating electromotive force is converted to a direct current by means of the rectifier 12, its magnitude is regulated by the regulator 14, and the battery is recharged.

Because all of the wire in a conventional automotive alternator having an 8-pole rotor 6 and a 9-slot concentrated-winding stator 8 is wound in concentration on the teeth 26, it has the advantages of enabling the rotor coil ends to be reduced in comparison to distributed winding or wave winding, of enabling the amount of wire used to be reduced, and of reducing copper loss, but harmonic frequencies of every order of the magnetic flux density waveform arise easily. Thus, one problem has been that magnetic flux surges due to mutual interference between these harmonic frequencies are increased, increasing variation in the generated voltage.

Another problem is that magnetic attraction arises between the claw-shaped magnetic poles 19, 20 of the rotor 6 and the stator 8, making the stator 8, the case 3, etc., resonate and the claw-shaped magnetic poles 19, 20 of the rotor 6 vibrate due to these harmonic frequencies, giving rise to sounds which are unpleasant to the passengers.

SUMMARY OF THE INVENTION

The present invention aims to solve the above problems and an object of the present invention is to provide an automotive alternator capable of reducing variation in the generated voltage and reducing noise by enabling the reduction of higher order stator magnetomotive harmonic frequencies which greatly affect flux surges and magnetic attraction between the stator and the rotor.

To this end, according to the present invention, there is provided a dynamo-electric machine comprising: a stator having a stator core formed with 9n slots (n being an integer greater than or equal to 1) extending longitudinally on its inner circumference, and a first 3-phase stator coil and a second 3-phase stator coil inserted into the slots; and a rotor disposed inside the stator so as to rotate freely having a rotor coil for passing electric current through and generating magnetic flux, and pole cores covering the rotor coil for forming 8n magnetic poles by means of the magnetic flux, the first 3-phase stator coil and the second 3-phase stator coil each comprising a U-phase coil portion, a V-phase coil portion, and a W-phase coil portion, each formed by winding wire onto teeth defining the slots, wherein each of the phase coil portions of the first 3-phase stator coil and the phase coil portions of the second 3-phase stator coil corresponding to the phase coil portions are positioned so as to be offset from one another by a distance of one tooth in the circumferential direction.

According to another aspect of the present invention, there is provided a dynamo-electric machine comprising: a stator having a stator core formed with 9n slots (n being an integer greater than or equal to 1) extending longitudinally on its inner circumference, and a 3-phase stator coil inserted into the slots; and a rotor disposed inside the stator so as to rotate freely having a rotor coil for passing electric current through and generating magnetic flux, and pole cores covering the rotor coil for forming 8n magnetic poles by means of the magnetic flux, the 3-phase stator coil comprising a U-phase coil portion, a V-phase coil portion, and a W-phase coil portion each formed by winding wire onto teeth defining the slots, wherein part of two phase coil portions from among the U-phase coil portion, the V-phase coil portion, and the W-phase coil portion is wound around every third tooth.

According to another aspect of the present invention, there is provided a dynamo-electric machine comprising: a stator having a stator core formed with 18n slots (n being an integer greater than or equal to 1) extending longitudinally on its inner circumference, and a first 3-phase stator coil and a second 3-phase stator coil inserted into said slots; and a rotor disposed inside the stator so as to rotate freely having a rotor coil for passing electric current through and generating magnetic flux, and pole cores covering the rotor coil for forming 8n magnetic poles by means of the magnetic flux, the first 3-phase stator coil and the second 3-phase stator coil each comprising a U-phase coil portion, a V-phase coil portion, and a W-phase coil portion each formed by winding wire around adjacent pairs of teeth defining the slots, each of the phase coil portions of said first 3-phase stator coil and the phase coil portions of the second 3-phase stator coil corresponding to the phase coil portions being positioned so as to be offset from one another by a distance of one tooth in the circumferential direction, wherein the pitch between center lines extending in the radial direction of adjacent openings of said slots is nonuniform.

DETAILED DESCRIPTION OF THE PREFERRED EMBODIMENTS

Embodiment 1

Figure 1:
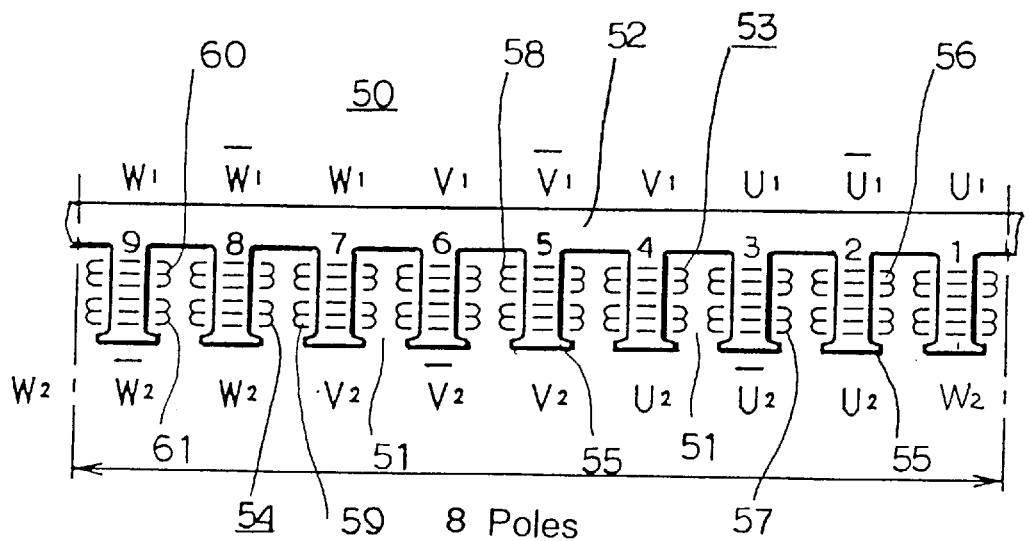
FIG. 1 is a flattened development of an automotive alternator according to Embodiment 1 of the present invention.
Figure 5:
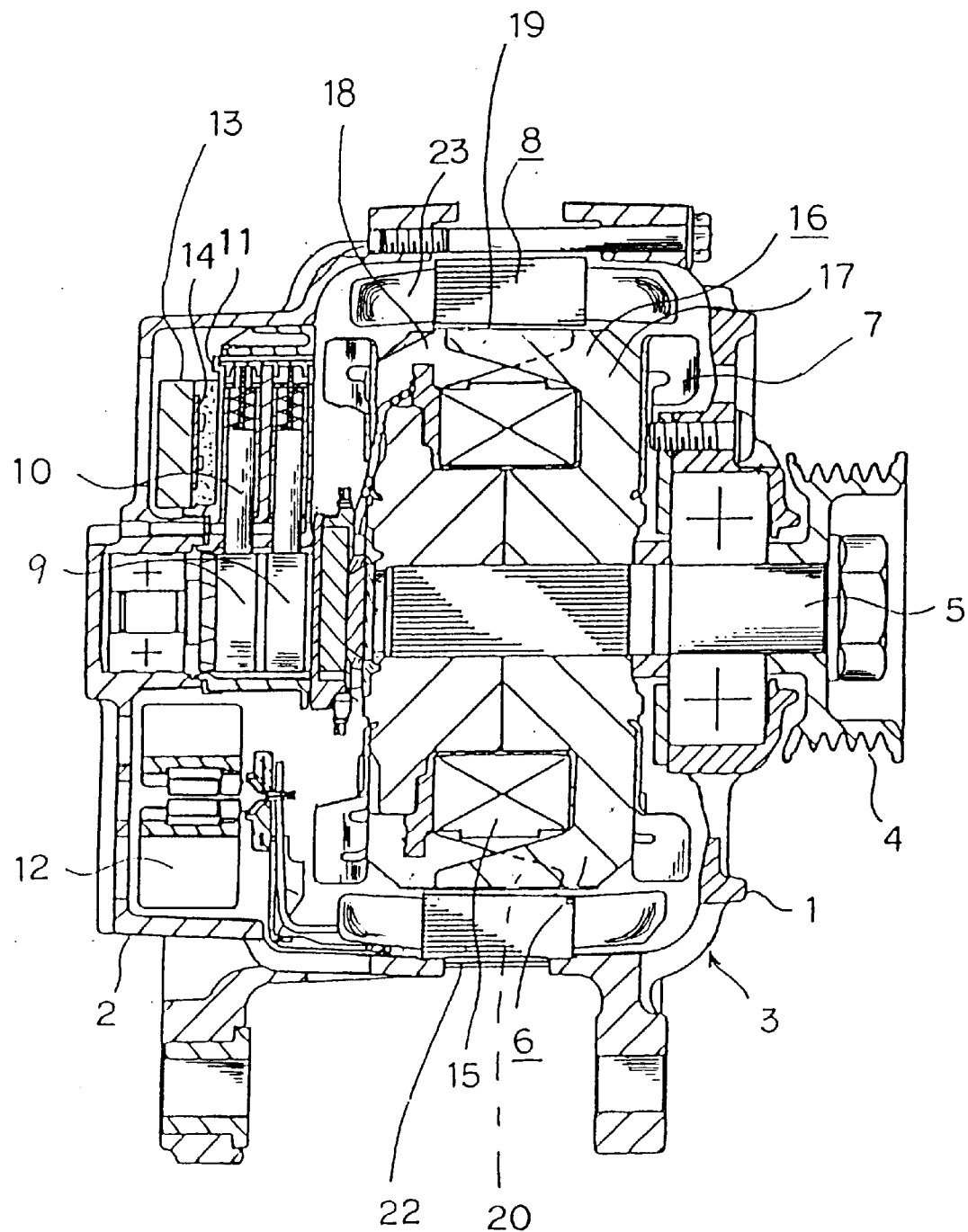
FIG. 5 is a cross-section of a conventional automotive alternator.
Figure 6:
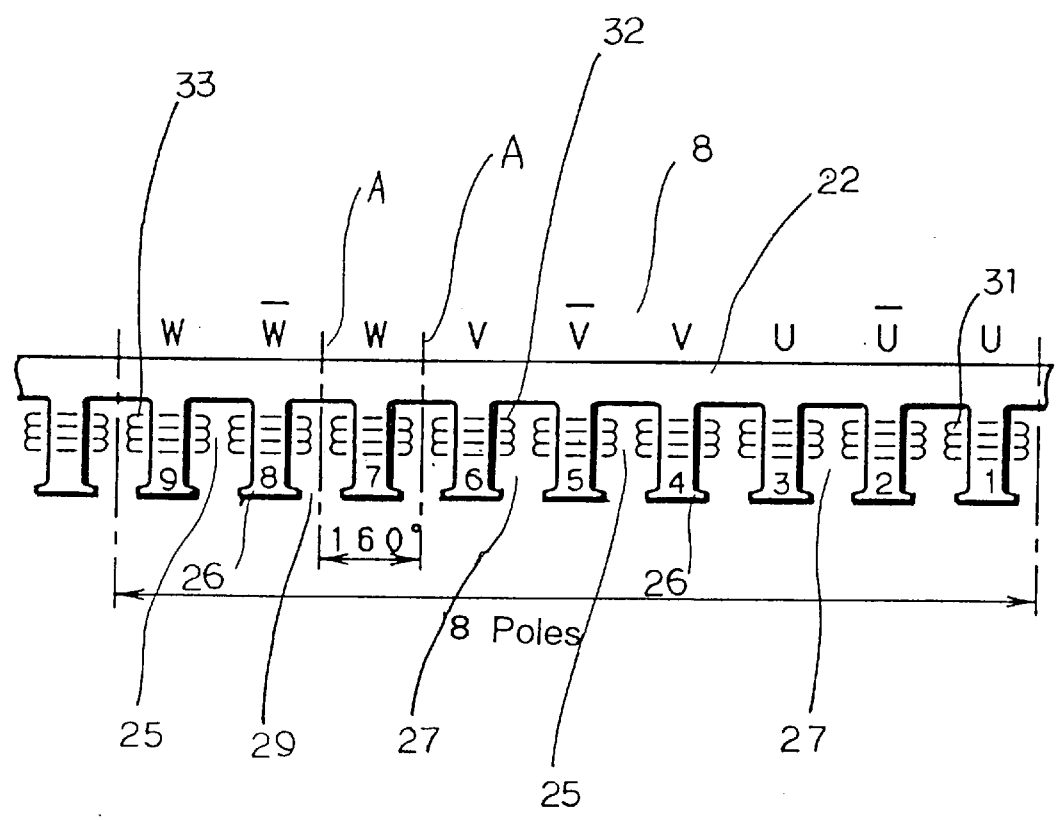
FIG. 6 is a flattened development of the stator in FIG. 5.

FIG. 1 is a diagram explaining a stator 50 for an automotive alternator being a dynamo-electric machine according to Embodiment 1 of the present invention, the annular stator 50 being shown flattened out. In this embodiment, the construction of parts other than the stator 50 is the same as the construction shown in FIG. 5 and will be explained below using the same numbering.

The stator 50 has a stator core 52 formed with nine slots 51 extending longitudinally on its inner circumference, and a first 3-phase stator coil 53 and a second 3-phase stator coil 54 inserted into the slots 51.

The first 3-phase stator coil 53 and the second 3-phase stator coil 54 comprise U-phase coil portions 56, 57, V-phase coil portions 58, 59, and W-phase coil portions 60, 61, respectively, each formed by winding wire onto the teeth 55 defining the slots 51.

The coil portions 56, 58, 60 of the first 3-phase stator coil 53 and the coil portions 57, 59, 61 of the second 3-phase stator coil 54 corresponding to the coil portions 56, 58, 60, are offset by one tooth 55 from each other in the circumferential direction such that the phase difference between the output current flowing in the first 3-phase stator coil 53 and that flowing in the second 3-phase stator coil 54 is 20 degrees (160 degrees).

The procedure for inserting the first 3-phase stator coil 53 and the second 3-phase stator coil 54 into the stator core 52 will now be explained.

First, wire is wound clockwise onto tooth 55 No. 1, and then the wire is wound counterclockwise onto tooth 55 No. 2. The wire is then wound clockwise onto tooth 55 No. 3 to form the U-phase coil portion 56 of the first 3-phase stator coil 53.

Similarly, wire is wound clockwise onto tooth 55 No. 4, then the wire is wound counterclockwise onto tooth 55 No. 5, and the wire is then wound clockwise onto tooth 55 No. 6 to form the V-phase coil portion 58 of the first 3-phase stator coil 53.

Similarly, wire is wound clockwise onto tooth 55 No. 7, then the wire is wound counterclockwise onto tooth 55 No. 8, and the wire is then wound clockwise onto tooth 55 No. 9 to form the W-phase coil portion 60 of the first 3-phase stator coil 53.

Then, one end of each of the U-phase coil portion 56, the V-phase coil portion 58, and the W-phase coil portion 60 is connected to an output terminal, and the other end of each is electrically connected to a neutral point.

Next, wire is wound clockwise onto tooth 55 No. 2, and then the wire is wound counterclockwise onto tooth 55 No. 3. The wire is then wound clockwise onto tooth 55 No. 4 to form the U-phase coil portion 57 of the second 3-phase stator coil 54.

Similarly, wire is wound clockwise onto tooth 55 No. 5, then the wire is wound counterclockwise onto tooth 55 No. 6, and the wire is then wound clockwise onto tooth 55 No. 7 to form the V-phase coil portion 59 of the second 3-phase stator coil 54.

Similarly, wire is wound clockwise onto tooth 55 No. 8, then the wire is wound counterclockwise onto tooth 55 No. 9, and the wire is then wound clockwise onto tooth 55 No. 1 to form the W-phase coil portion 61 of the second 3-phase stator coil 54.

Then, one end of each of the U-phase coil portion 57, the V-phase coil portion 59, and the W-phase coil portion 61 is connected to an output terminal, and the other end of each is electrically connected to a neutral point.

In this embodiment, the first 3-phase stator coil 53 and the second 3-phase stator coil 54 are mounted on the teeth 55 such that the coil portions 56, 58, 60 of the first 3-phase stator coil 53 and the coil portions 57, 59, 61 of the second 3-phase stator coil 54 corresponding to those coil portions 56, 58, 60, are offset by one tooth 55 from each other in the circumferential direction, and as can be seen from Table 1, the rate of generation of stator magnetomotive harmonic frequencies (relative to the fundamental frequency) can be reduced thereby compared to the concentrated winding represented by the conventional example. Table 1 was obtained by the present inventors by electromagnetic field analysis.

TABLE 1

Content of magnetomotive harmonic frequencies in an 8-pole rotor, 9-slot stator.

| Order of harmonic frequency | Conventional example (%) | Embodiment 1 (%) | Embodiment 2 (%) |
| --- | --- | --- | --- |
| 0.25 | 25.7 | 12.8 | 8.9 |
| 0.50 | 29.6 | 14.8 | 19.3 |
| 1.25 | 80.0 | 80.0 | 80.0 |
| 3.25 | 30.8 | 30.8 | 30.8 |
| 3.50 | 28.6 | 28.6 | 28.6 |

Embodiment 2

Figure 2:
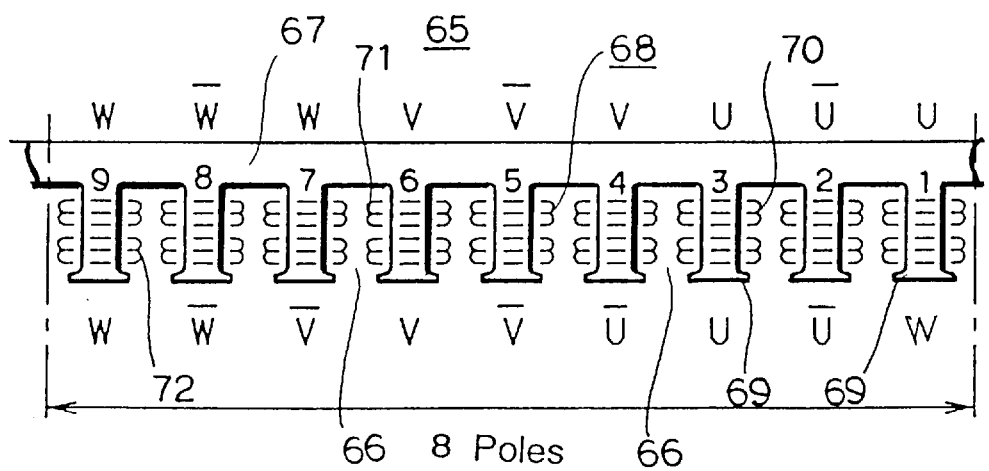
FIG. 2 is a flattened development of an automotive alternator according to Embodiment 2 of the present invention.

FIG. 2 is a diagram explaining a stator 65 for an automotive alternator being a dynamo-electric machine according to Embodiment 2 of the present invention, the annular stator 65 being shown flattened out.

The stator 65 has a stator core 67 formed with nine slots 66 extending longitudinally on its inner circumference, and a 3-phase stator coil 68 inserted into the slots 66.

The 3-phase stator coil 68 comprises a U-phase coil portion 70, a V-phase coil portion 71, and a W-phase coil portion 72 each formed by winding wire onto the teeth 69 defining the slots 66.

Part of the U-phase coil portion 70 and part of the W-phase coil portion 72 are wound onto tooth 69 No. 1. Part of the U-phase coil portion 70 and part of the V-phase coil portion 71 are wound onto tooth 69 No. 4. Part of the V-phase coil portion 71 and part of the W-phase coil portion 72 are wound onto tooth 69 No. 7.

The procedure for inserting the 3-phase stator coil 68 into the stator core 67 will now be explained.

First, wire is wound clockwise onto tooth 69 No. 1, then the wire is wound counterclockwise onto tooth 69 No. 2, the wire is then wound clockwise onto tooth 69 No. 3, and then the wire is additionally wound counterclockwise partway around tooth 69 No. 4 to form the U-phase coil portion 70 of the 3-phase stator coil 68.

Similarly, wire is wound clockwise from partway around tooth 69 No. 4, then the wire is wound counterclockwise onto tooth 69 No. 5, the wire is then wound clockwise onto tooth 69 No. 6, and then the wire is additionally wound counterclockwise partway around tooth 69 No. 7 to form the V-phase coil portion 71 of the 3-phase stator coil 68.

Similarly, wire is wound clockwise onto tooth 69 No. 7, then the wire is wound counterclockwise onto tooth 69 No. 8, the wire is then wound clockwise onto tooth 69 No. 9, and then the wire is additionally wound partway around tooth 69 No. 1 to form the W-phase coil portion 72 of the 3-phase stator coil 68.

Then, one end of each of the U-phase coil portion 70, the V-phase coil portion 71, and the W-phase coil portion 72 is connected to an output terminal, and the other end of each is electrically connected to a neutral point.

In Embodiment 2, part of the U-phase coil portion 70 and part of the W-phase coil portion 72 are wound onto tooth 69 No. 1, part of the U-phase coil portion 70 and part of the V-phase coil portion 71 are wound onto tooth 69 No. 4, and part of the V-phase coil portion 71 and part of the W-phase coil portion 72 are wound onto tooth 69 No. 7, and as can be seen from Table 1, the rate of generation of stator magnetomotive harmonic frequencies (relative to the fundamental frequency) can be reduced thereby compared to the concentrated winding represented by the conventional example.

Embodiment 3

Figure 3:
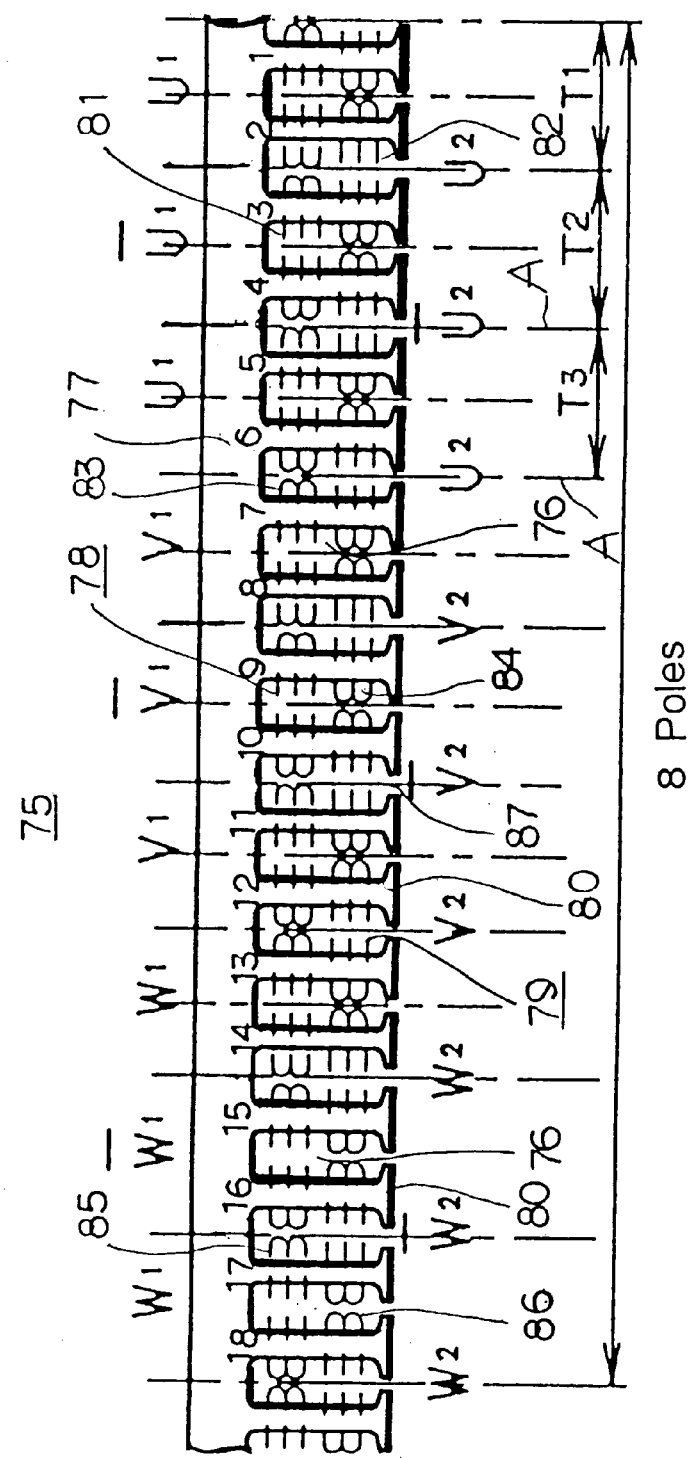
FIG. 3 is a flattened development of an automotive alternator according to Embodiment 3 of the present invention.

FIG. 3 is a diagram explaining a stator 75 for an automotive alternator being a dynamo-electric machine according to Embodiment 3 of the present invention, the annular stator 75 being shown flattened out.

The stator 75 has a stator core 77 formed with 18 slots 76 extending longitudinally on its inner circumference, and a first 3-phase stator coil 78 and a second 3-phase stator coil 79 inserted into the slots 76.

A rotor 6 having a rotor coil 15 for passing an electric current through and generating a magnetic flux, and a pole core 16 covering the rotor coil 15 in which 8 magnetic poles are produced by means of the magnetic flux, is disposed inside the stator 75 so as to rotate freely.

The first 3-phase stator coil 78 and the second 3-phase stator coil 79 comprise U-phase coil portions 81, 82, V-phase coil portions 83, 84, and W-phase coil portions 85, 86, respectively, each formed by winding wire around adjacent pairs of teeth 80 defining the slots 76.

The coil portions 81, 83, 85 of the first 3-phase stator coil 78 and the coil portions 82, 84, 86 of the second 3-phase stator coil 79 corresponding to those coil portions 81, 83, 85, are offset by a distance of one tooth 80 from each other in the circumferential direction.

The slots 76 are formed such that the pitch T1, T2, T3 between adjacent center lines A of the openings 36 extending in the radial direction is nonuniform.

Figure 4:
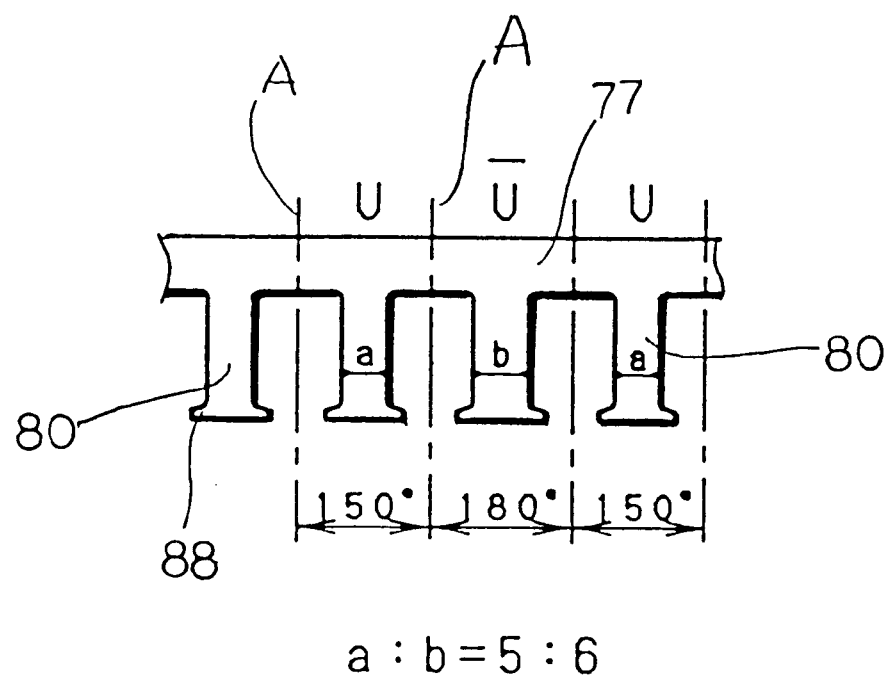
FIG. 4 is a diagram showing an example in which the spacing between the center lines of the openings of the slots are nonuniform.

FIG. 4 shows an example where the values of the pitch T1, T2, T3 are given an electrical angle of 150 degrees, 180 degrees, and 150 degrees, respectively. In this example, the pitch T1, T2, T3 is fixed by setting the width in the circumferential direction of the intermediate portions of the teeth 80 to meet the relationship a:b=5:6.

Moreover, the pitch T1, T2, T3 may also be fixed by adjusting the length in the circumferential direction of flanges 88 on the tips of the teeth 80.

Furthermore, the flanges 88 do not have to be formed during punching of the sheet metal; they may be formed by shaping the ends of the teeth 80 after the three-phase stator coils 78, 79 have been inserted into the stator core 77.

The procedure for inserting the first 3-phase stator coil 78 and the second 3-phase stator coil 79 into the stator core 77 will now be explained.

First, wire is wound clockwise around tooth 80 No. 1 and tooth 80 No. 2, then the wire is wound counterclockwise around teeth 80 No. 3 and No. 4, the wire is then wound clockwise around teeth 80 No. 5 and No. 6 to form the U-phase coil portion 81 of the first 3-phase stator coil 78.

Similarly, wire is wound clockwise around tooth 80 No. 7 and tooth 80 No. 8, then the wire is wound counterclockwise around teeth 80 No. 9 and No. 10, the wire is then wound clockwise around teeth 80 No. 11 and No. 12 to form the V-phase coil portion 83 of the first 3-phase stator coil 78.

Similarly, wire is wound clockwise around tooth 80 No. 13 and tooth 80 No. 14, then the wire is wound counterclockwise around teeth 80 No. 15 and No. 16, the wire is then wound clockwise around teeth 80 No. 17 and No. 18 to form the W-phase coil portion 85 of the first 3-phase stator coil 78.

Then, one end of each of the U-phase coil portion 81, the V-phase coil portion 83, and the W-phase coil portion 85 is connected to an output terminal, and the other end of each is electrically connected to a neutral point.

Next, wire is wound clockwise around tooth 80 No. 2 and tooth 80 No. 3, then the wire is wound counterclockwise around teeth 80 No. 4 and No. 5, the wire is then wound clockwise around teeth 80 No. 6 and No. 7 to form the U-phase coil portion 82 of the second 3-phase stator coil 79.

Similarly, wire is wound clockwise around tooth 80 No. 8 and tooth 80 No. 9, then the wire is wound counterclockwise around teeth 80 No. 10 and No. 11, the wire is then wound clockwise around teeth 80 No. 12 and No. 13 to form the V-phase coil portion 84 of the second 3-phase stator coil 79.

Similarly, wire is wound clockwise around tooth 80 No. 14 and tooth 80 No. 15, then the wire is wound counterclockwise around teeth 80 No. 16 and No. 17, the wire is then wound clockwise around teeth 80 No. 18 and No. 1 to form the W-phase coil portion 86 of the second 3-phase stator coil 79.

Then, one end of each of the U-phase coil portion 82, the V-phase coil portion 84, and the W-phase coil portion 86 is connected to an output terminal, and the other end of each is electrically connected to a neutral point.

In Embodiment 3, the coil portions 81, 83, 85 of the first 3-phase stator coil 78 and the coil portions 82, 84, 86 of the second 3-phase stator coil 79 corresponding to those coil portions 81, 83, 85, are offset by a distance of one tooth 80 from each other in the circumferential direction, and the slots 76 are formed such that the pitch T1, T2, T3 between adjacent center lines A of the openings 36 extending in the radial direction is uneven. For that reason, as can be seen from Table 2, the rate of generation of stator magnetomotive harmonic frequencies (relative to the fundamental frequency) is reduced compared to even pitch when the order of the harmonic frequency is 0.25. Table 2 shows results obtained by the present inventors by three-dimensional electromagnetic field analysis.

Furthermore, as shown in Table 3, it can be seen that when the pitch is nonuniform, the winding factor is large compared to when the pitch is uniform, improving generated output.

Moreover, in each of the above embodiments an automotive alternator has been used to explained a dynamo-electric machine, but the present invention can also be applied to an electric motor.

TABLE 2

Content of stator magnetomotive harmonic frequencies (8n poles, 18n slots).

| Order of harmonic frequency | Pitch uniform (%) | Pitch nonuniform (%) |
| --- | --- | --- |
| 0.25 | 22.2 | 11.7 |
| 0.50 | 14.8 | 14.6 |
| 1.25 | 0 | 14.8 |
| 3.25 | 0 | 5.7 |
| 3.50 | 28.6 | 21.0 |

TABLE 3

| Winding factor | |
| --- | --- |
| One wave winding per pole per phase (8 poles, 24 slots) | 1.000 |
| Conventional example (8 poles, 9 slots) | 0.945 |
| Embodiment 1 | 0.945 |

TABLE 3-continued

| Winding factor | |
| --- | --- |
| Embodiment 2 | 0.917 |
| Pitch uniform (8 poles, 18 slots, 2 × 3-phase windings) | 0.945 |
| Pitch nonuniform (8 poles, 18 slots, 2 × 3-phase windings) | 0.955 |
| Pitch nonuniform (8 poles, 9 slots, 2 × 3-phase windings | 0.955 |

As explained above, a dynamo-electric machine according to one aspect of the present invention comprises: a stator having a stator core formed with 9n slots (n being an integer greater than or equal to 1) extending longitudinally on its inner circumference, and a first 3-phase stator coil and a second 3-phase stator coil inserted into the slots; and a rotor disposed inside the stator so as to rotate freely having a rotor coil for passing electric current through and generating magnetic flux, and pole cores covering the rotor coil for forming 8n magnetic poles by means of the magnetic flux, the first 3-phase stator coil and the second 3-phase stator coil each comprising a U-phase coil portion, a V-phase coil portion, and a W-phase coil portion, each formed by winding wire onto teeth defining the slots, wherein each of the phase coil portions of the first 3-phase stator coil and the phase coil portions of the second 3-phase stator coil corresponding to the phase coil portions are positioned so as to be offset from one another by a distance of one tooth in the circumferential direction. Therefore, the generation of stator magnetomotive harmonic frequencies is suppressed even in concentrated windings, enabling the reduction of variations in output and reduction of the generation of noise.

Also, a dynamo-electric machine according to another aspect of the present invention comprises: a stator having a stator core formed with 9n slots (n being an integer greater than or equal to 1) extending longitudinally on its inner circumference, and a 3-phase stator coil inserted into the slots; and a rotor disposed inside the stator so as to rotate freely having a rotor coil for passing electric current through and generating magnetic flux, and pole cores covering the rotor coil for forming 8n magnetic poles by means of the magnetic flux, the 3-phase stator coil comprising a U-phase coil portion, a V-phase coil portion, and a W-phase coil portion each formed by winding wire onto teeth defining the slots, wherein part of two phase coil portions from among the U-phase coil portion, the V-phase coil portion, and the W-phase coil portion is wound around every third tooth. Therefore, the generation of stator magnetomotive harmonic frequencies is suppressed even in concentrated windings, enabling the reduction of variations in generated output and reduction of the generation of noise.

Further, a dynamo-electric machine according to another aspect of the present invention comprises: a stator having a stator core formed with 18n slots (n being an integer greater than or equal to 1) extending longitudinally on its inner circumference, and a first 3-phase stator coil and a second 3-phase stator coil inserted into said slots; and a rotor disposed inside the stator so as to rotate freely having a rotor coil for passing electric current through and generating magnetic flux, and pole cores covering the rotor coil for forming 8n magnetic poles by means of the magnetic flux, the first 3-phase stator coil and the second 3-phase stator coil each comprising a U-phase coil portion, a V-phase coil portion, and a W-phase coil portion each formed by winding wire around adjacent pairs of teeth defining the slots, each of the phase coil portions of said first 3-phase stator coil and the phase coil portions of the second 3-phase stator coil corresponding to the phase coil portions being positioned so as to be offset from one another by a distance of one tooth in the circumferential direction, wherein the pitch between center lines extending in the radial direction of adjacent openings of said slots is nonuniform. Therefore, the generation of stator magnetomotive harmonic frequencies of the order of 0.25 is suppressed even in concentrated windings, enabling the reduction of variations in generated voltage and reduction of the generation of noise. Furthermore, the winding factor is increased, improving output. In addition, the angle of the output phase difference can be set according to the surges targeted for reduction independent of the number of slots.

According to one form of the dynamo-electric machine, the flanges extending in the circumferential direction may be formed on the ends of teeth defining the slots; and the length of the flanges may be used to adjust the pitch between the center lines of the adjacent openings. Therefore, the pitch between the center lines of the openings of adjacent openings can be easily adjusted by means of the length of the flanges.

According to another form of the dynamo-electric machine, the width of the intermediate portion of the teeth defining the slots in the circumferential direction may be nonuniform. Therefore, when magnetic flux passing through the small-width teeth increases, magnetic saturation is promoted, but in the adjacent large-width teeth, magnetic saturation is instead moderated, increasing output.

According to still another form of the dynamo-electric machine, the number of slots may be 18, the number of magnetic poles may be 8, and the pitch between the center lines of the adjacent openings may be at electrical angles of 60 degrees and 90 degrees. Therefore, the generation of stator magnetomotive harmonic frequencies of the order of 0.25 is reliably suppressed even in concentrated windings, enabling the reduction of variations in output and reduction of the generation of noise. Furthermore, the winding factor is increased, improving output.

What is claimed is:

1. A dynamo-electric machine comprising:
   a stator having a stator core formed with 9n slots (n being an integer greater than or equal to 1) extending longitudinally on its inner circumference, and a first 3-phase stator coil and a second 3-phase stator coil inserted into said slots; and
   a rotor disposed inside said stator so as to rotate freely having a rotor coil for passing electric current through and generating magnetic flux, and pole cores covering said rotor coil for forming 8n magnetic poles by means of said magnetic flux,
   said first 3-phase stator coil and said second 3-phase stator coil each comprising a U-phase coil portion, a V-phase coil portion, and a W-phase coil portion, each formed by winding wire onto teeth defining said slots,
   wherein each of said phase coil portions of said first 3-phase stator coil and said phase coil portions of said second 3-phase stator coil corresponding to said phase coil portions are positioned so as to be offset from one another by a distance of one tooth in the circumferential direction.

2. The dynamo-electric machine according to claim 1 wherein the width of the intermediate portion of said teeth defining said slots in the circumferential direction is nonuniform.

3. A dynamo-electric machine comprising:
   a stator having a stator core formed with 9n slots (n being an integer greater than or equal to 1) extending longitudinally on its inner circumference, and a 3-phase stator coil inserted into said slots; and
   a rotor disposed inside said stator so as to rotate freely having a rotor coil for passing electric current through and generating magnetic flux, and pole cores covering said rotor coil for forming 8n magnetic poles by means of said magnetic flux,
   said 3-phase stator coil comprising a U-phase coil portion, a V-phase coil portion, and a W-phase coil portion each formed by winding wire onto teeth defining said slots,
   wherein part of two phase coil portions from among said U-phase coil portion, said V-phase coil portion, and said W-phase coil portion is wound around every third tooth.

4. A dynamo-electric machine comprising:
   a stator having a stator core formed with 18n slots (n being an integer greater than or equal to 1) extending longitudinally on its inner circumference, and a first 3-phase stator coil and a second 3-phase stator coil inserted into said slots; and
   a rotor disposed inside said stator so as to rotate freely having a rotor coil for passing electric current through and generating magnetic flux, and pole cores covering said rotor coil for forming 8n magnetic poles by means of said magnetic flux,
   said first 3-phase stator coil and said second 3-phase stator coil each comprising a U-phase coil portion, a V-phase coil portion, and a W-phase coil portion each formed by winding wire around adjacent pairs of teeth defining said slots,
   each of said phase coil portions of said first 3-phase stator coil and said phase coil portions of said second 3-phase stator coil corresponding to said phase coil portions being positioned so as to be offset from one another by a distance of one tooth in the circumferential direction,
   wherein the pitch between center lines extending in the radial direction of adjacent openings of said slots is nonuniform.

5. The dynamo-electric machine according to claim 4 wherein:
   flanges extending in the circumferential direction are formed on the ends of teeth defining said slots; and
   the length of said flanges is used to adjust said pitch between said center lines of said adjacent openings.

6. The dynamo-electric machine according to claim 4 wherein:
   said number of slots is 18;
   said number of magnetic poles is 8; and
   said pitch between said center lines of said adjacent openings is at electrical angles of 60 degrees and 90 degrees.

* * * * *